United States Patent

[11] 3,611,385

[72] Inventor Thomas F. McHenry
Norwalk, Conn.
[21] Appl. No. 776,657
[22] Filed Nov. 18, 1968
[45] Patented Oct. 5, 1971
[73] Assignee Barnes Engineering Company
Stanford, Conn.

[54] COLLISION AVOIDANCE SYSTEM
6 Claims, 6 Drawing Figs.
[52] U.S. Cl. .................................................. 343/112 CA,
250/83.3 H
[51] Int. Cl. ........................................................ G08g 5/04,
H01j 39/00
[50] Field of Search .......................................... 250/83.31
R; 343/112.4; 340/27 N

[56]  References Cited
UNITED STATES PATENTS
2,919,350  12/1959  Taylor et al ..................  250/83.3
3,345,633  10/1967  Runge ..........................  343/112

Primary Examiner—Rodney D. Bennett, Jr.
Assistant Examiner—Richard E. Berger
Attorneys—Joseph Levinson and Robert Ames Norton ABSTRACT: Aircraft are provided with a beacon for generating predetermined repetitive signals and sensors capable of informing the pilot of the presence, direction and range of another approaching aircraft. The sensor units are comprised of at least three detector pairs positioned in three orthogonal axes which are responsive to and generate signals in accordance with the radiation received from the beacon of the approaching aircraft. Signal recognition means are coupled to the detectors for detecting the predetermined repetitive signals and discriminating against all other signals. Logic circuitry is provided for deriving signals indicative of azimuth, elevation and range of the signals from the approaching aircraft, and these signals may be utilized in a display means for providing a visual indication of the position of the approaching aircraft.

PATENTED OCT 5 1971 3,611,385

INVENTOR.
THOMAS F. McHENRY
BY Joseph Levinson
ATTORNEY

COLLISION AVOIDANCE SYSTEM

BACKGROUND OF THE INVENTION

Rapidly increasing use of the airways for both commercial and private use has caused major congestion at most airports. The massive number of planes in the air has overtaxed ground control facilities, and has increased the human error factor, resulting in several midair collisions and numerous near-misses. Increasing future demands will increase the danger and frequency of midair collisions. The purpose of the present invention is to provide a simple, rugged aircraft collision avoidance system which is capable of informing the pilot of the presence, direction and range of other aircraft, so that the danger of midair collisions will be alleviated.

SUMMARY OF THE INVENTION

In carrying out this invention in one illustrative embodiment thereof, aircraft are provided with flashing beacons and sensors for detecting the flashes of approaching aircraft. The sensor is provided with at least three detector pairs looking in opposite directions and positioned on three orthogonal axes which are responsive to the repetitive flashes of the beacons of approaching aircraft. Signal recognition means are provided for the detectors for passing the predetermined repetitive beacon signals while discriminating against other signals, and logic circuitry is provided for producing signals which are indicative of azimuth, elevation, and range of the predetermined signals of the approaching aircraft. Display means are provided to indicate the position of approaching aircraft.

DESCRIPTION OF THE PREFERRED EMBODIMENT

Figure 1:
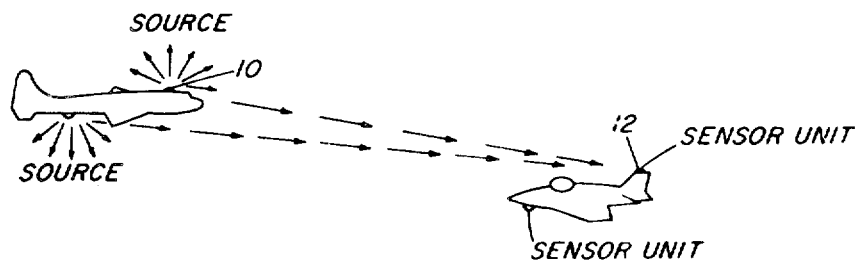
FIG. 1 is a diagram showing approaching aircraft equipped with source and sensor units.

For ease of illustration, FIG. 1 shows two approaching aircraft, one having sources 10 and the other containing sensor units 12. It will be appreciated, however, that each aircraft will include both sources and sensor units. The source 10 is a flashing beacon, which flashes in the neighborhood of 30 microseconds. Different aircraft will have different flashing rates, so that a multiplicity of targets may be tracked by the system. The source should be sufficiently bright to be able to be detected over a range of several miles, and it must radiate in the spectral band compatible with the detector used. In the present application, a xenon flash lamp is suitable, but the invention is not considered limited to specific types of sources.

Figure 2:
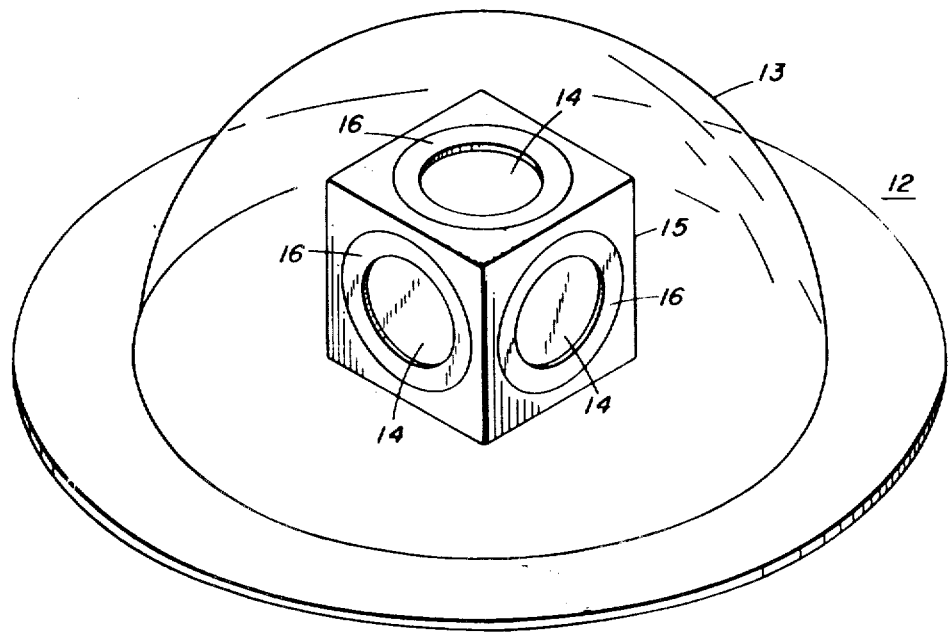
FIG. 2 shows a preferred embodiment of the sensor unit utilized in the collision avoidance system of this invention.

The sensor unit 12 is adapted to receive the signals from the source 10. In the broader aspects of this invention, the sensor unit 12 which contains the detectors for picking up the radiation from the source 10 will include at least three detector pairs positioned to look in opposite directions along three orthogonal axes which will be referred to herein as axes X, Y and Z. By placing detectors in this fashion, an entire sphere is covered, which provides omnidirectional protection with a multiple target capability. One way of achieving this positioning would be providing detectors looking in opposite directions from the wing tips, from the nose and tail, and from the top and bottom of the aircraft. Although this and other arrangements will work, it will require a great deal of wiring in the aircraft which is unnecessary. The preferred arrangement is shown in FIG. 2, in which the sensors 12 are dome-enclosed cubes. A silicon-infrared detector 14 is centered in each of five faces of the cube 15, and enclosed by a shallow reflective collar 16, the purpose of which will be hereinafter defined, with the remaining face being used for mounting and a connector. One of the sensor units will be mounted on top of the aircraft, for example on the tail, as shown in FIG. 1, and one will be mounted below, such that the detectors are looking oppositely along three orthogonal axes to develop the directional information in accordance with this invention. The detectors 14 of the cube 15 are protected from damage by a hemispherical optical dome 13. The dome may be of type 2600 glass made by Corning Glass Works, whose transmission characteristic includes a band-pass of 0.75–0.96 microns, which is quite suitable for detection by a silicon photodiode detector 14. Other types of domes may be utilized which may include plastic films which act as filters in the desired spectral band. The indicated spectral band is utilized to avoid detector saturation. Most optical devices are saturated or incapacitated by having the sun in the field of view, which, of course, is one of the problems the pilot has to face in visually attempting to see other aircraft. Accordingly, the system, to be operative, must include the possibility of full sun in the field of view of the detector and yet not saturate or destroy the detector. In the present application the silicon detector has been selected along with the wave band indicated because the silicon detector is near peak sensitivity at the 0.8–0.95 micron region and the xenon source is especially rich in spectral lines in that region, while the solar irradiance is small in this region. The silicon photodiode detector 14 has a linear dynamic range which extends over seven orders of magnitude. Accordingly, it will not saturate in the presence of sun, and will respond to the radiation from the source desired to be detected.

In order to determine the direction of the source, the positioning of the detectors, which is a basic concept in the present invention, will be discussed. If a flat detector is placed in a collimated uniform beam of radiation, it will subtend a maximum area of the beam when the normal-to-the-surface of the detector is parallel to the beam direction. The amount of subtended area, and thus the amount of incident radiation on the detector, will be exactly equal to the cosine of the angle between the surface normal and the beam direction. Furthermore, if the detector surface were a perfect Lambertian absorber of radiation, the response of the detector would be proportional to the cosine of the incident angle. Assuming this to be the case, a beam of intensity I would produce a resresponse of IA cos $\theta$ where A is the detector area.

Figure 4:
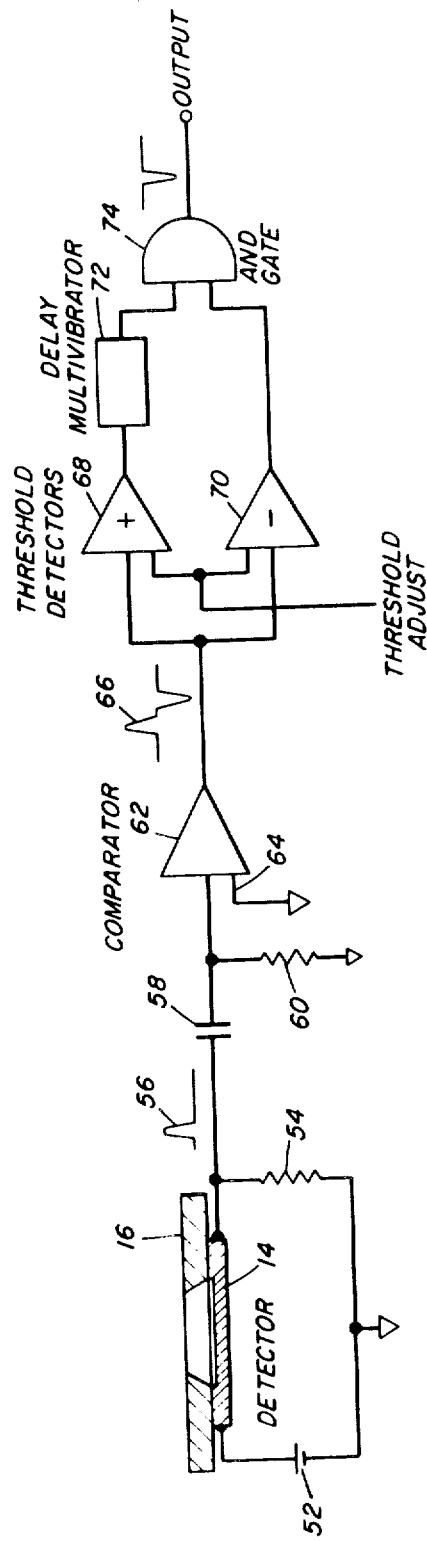
FIG. 4 shows a pulse recognition circuit which may be used in the circuit of FIG. 3.

A second detector, of equal responsivity and area to the first, mounted with its surface at 90° to the surface of the first, would produce a signal equal to IA cos $(\pi/2 - \theta) = IA$ sin $\theta$. The ratio of the signals from the two detectors is $IA$ sin $\theta/IA$ cos $\theta =$ tan $\theta$. Accordingly the direction of the source is precisely determinable, except for the fact that the surface of the detector does not absorb all the radiation at large angles of incidence but falls off from the cosine response rapidly. This problem is treated in the present invention by providing a reflective collar 16 for the detectors 14. The reflective collar 16, as will best be seen in FIG. 4, is a washer with a tapered hole, the inside walls of which are reflective. The taper angle of the collar 16 is equal to the angle of incidence beyond which response is to be enhanced. The small hole side of the collar 16 is the effective aperture, and the large hole side faces the detector. Rays striking the detector fact at, for example, 85° incidence are reflected, and strike the walls of the collar, where they are rereflected and strike the surface of the detector. The rereflection, however, is at a smaller angle, and therefore is effectively absorbed, producing a detector response.

Figure 3:
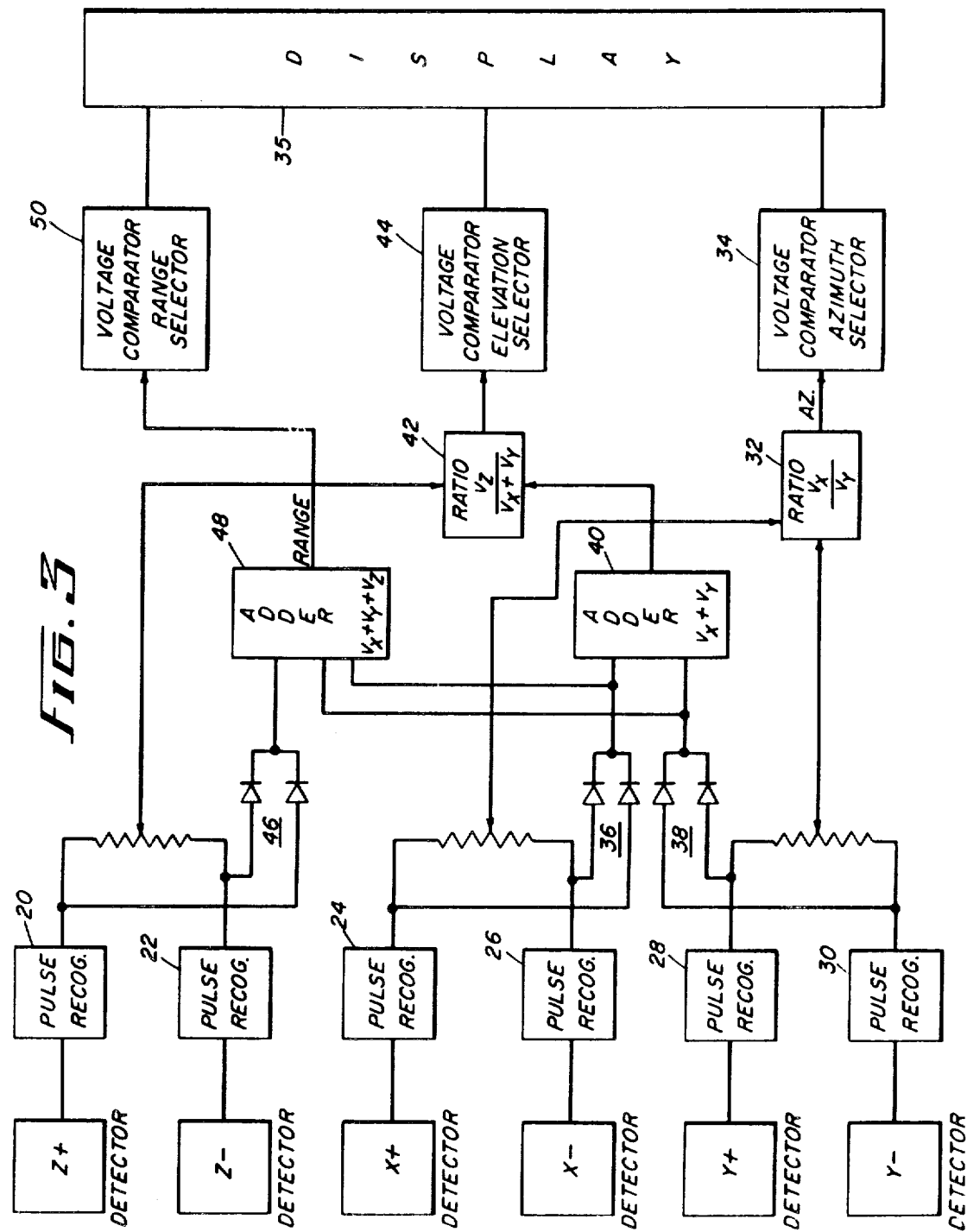
FIG. 3 illustrates a schematic block diagram of the collision avoidance system embodied in this invention.

As a result of aircraft maneuvers, source flashes, sun glints, and other changes in incident radiation in the 0.8–1 micron region, each detector 14 will produce a current signal train proportional to radiation containing frequencies from DC to some 300 kilocycles. The function of the electronic processing is to identify the beacon flash and, having identified it, process the signals ensuing from the detectors, determining and displaying azimuth, elevation, and range. This is shown functionally in the block diagram of FIG. 3. In FIG. 3 the infrared detectors have been designated in accordance with the three orthogonal axes X, Y and Z, on which they are positioned, with a plus and minus designation to indicate the opposed directions upon those axes in which they are viewing. As has been indicated in the preferred embodiment for providing the three orthogonal axes configuration, two sensors of the cube shape 15 are preferred. Accordingly, the X and Y-detectors will have two forward and backward looking detectors as well as two left- and right-looking detectors. These have been indicated in FIG. 3 in one block with the block representing the larger output of each pair. A plurality of pulse recognition circuits 20, 22, 24, 26, 28 and 30 are connected to the Z-, X-, and Y-detectors. The function of the pulse recognition circuit is to pass signals from the beacon source 10 and to discriminate against all other radiation. The X, Y and Z detectors serve as direction resolvers. The flashing beacon 10 will be detected in more than one detector field, usually in three. The amplitudes of the separate detector outputs appearing at the output of their respective pulse recognition circuits are vector direction components. If the forward and backward-looking detectors are characterized with outputs as $+V_x$ and $-V_x$ respectively, and the left and right detectors are similarly designated $+V_y$ and $-V_y$, the tangent of the azimuth angle is simply $V_x/V_y$. This is shown in FIG. 3, in which the outputs of the X detectors from pulse recognition circuits 24 and 26 are applied to a ratio circuit 32 along with the outputs of the Y detectors from pulse recognition circuits 28 and 30. The output of ratio circuit 32, which is the azimuth signal, is applied to a voltage comparator azimuth selector 34 onto a display 35 to provide an indication of azimuth.

Elevation is similarly determined as $V_z/V_x+V_y$. To provide this relationship, the outputs of the X detectors from pulse recognition circuits 24 and 26 are applied via a diode comparator circuit 36, which applies the larger of the signals from pulse recognition circuits 24 and 26 to an adder 40, and the outputs of the Y detectors from pulse recognition circuits 28 and 30 are applied via a diode comparator 38 to the adder circuit 40, which combines the outputs from the X- and Y-detectors. The output from the Z detectors from pulse recognition circuits 20 and 22 are applied to a ratio circuit 42, along with the output from the adder circuit 40 to provide the elevational signal which is applied to a voltage comparator elevation selector 44, and from there to the display 35.

Range is derived by summing all of the signals. This will provide a relative range measurement, but it will be appreciated that more exact range information can be obtained by taking the square root of the sum of the squares of the components. For the relative range measurement, as indicated herein, an adder circuit 48 is provided which combines the outputs of diode comparator circuits 46, 36 and 38 from the Z-, X- and Y-detectors, respectively. The range signal from the adder circuit 48 is applied to a voltage comparator range selector 50, and from there to the display 35.

The pulse recognition circuits identify the predetermined desired pulses from the beacon source 10, and discriminate against false signals. One form of this circuit is shown in FIG. 4, which generally functions the same as the discriminator circuits shown and described in application 669,049, now U.S. Pat. No. 3,476,938, entitled GUNFLASH DETECTOR, which is assigned to the same assignee as the present application. The circuit in FIG. 4 differs therefrom in having a different zero volt reference level, in order to accommodate operation at the higher frequencies present in the flashing beacon application.

Referring now to FIG. 4, the photodiode detector 14 is provided with a bias supply 52 and a load resistor 54. As has been pointed out previously, the detector 14 cannot operate over a wide dynamic range in a linear fashion if it is permitted to saturate. Accordingly, the bias voltage 52 and the load resistor 54 must be chosen so that under conditions of maximum illumination of the detector 14, it does not saturate. Pulses such as 56 from the flashing beacon are applied via a capacitor 58 and resistor 60 to comparator 62, while the other input 64 is grounded. The comparator 62 provides a controlled width pulse in response to signals from the detector 14, with the pulse width being controlled by a comparison between the desired pulse 56 and its integral. The resulting output, as characterized by waveform 66, is applied to a pair of threshold detectors 68 and 70. Threshold detector 68 detects positive-going signals which trigger a delay multivibrator 72. The threshold detector 70 is responsive to negative-going signals and if it is exceeded within the interval of the delay multivibrator 72, a desired signal is confirmed and an output is generated from an AND gate 74. If the AND gate 74 is not activated, the signal applied to the pulse recognition circuit was a false signal and not one of the desired predetermined signals generated by the beacon source 10. The output of the pulse recognition circuit so described is utilized in the manner shown in FIG. 3.

Figure 5:
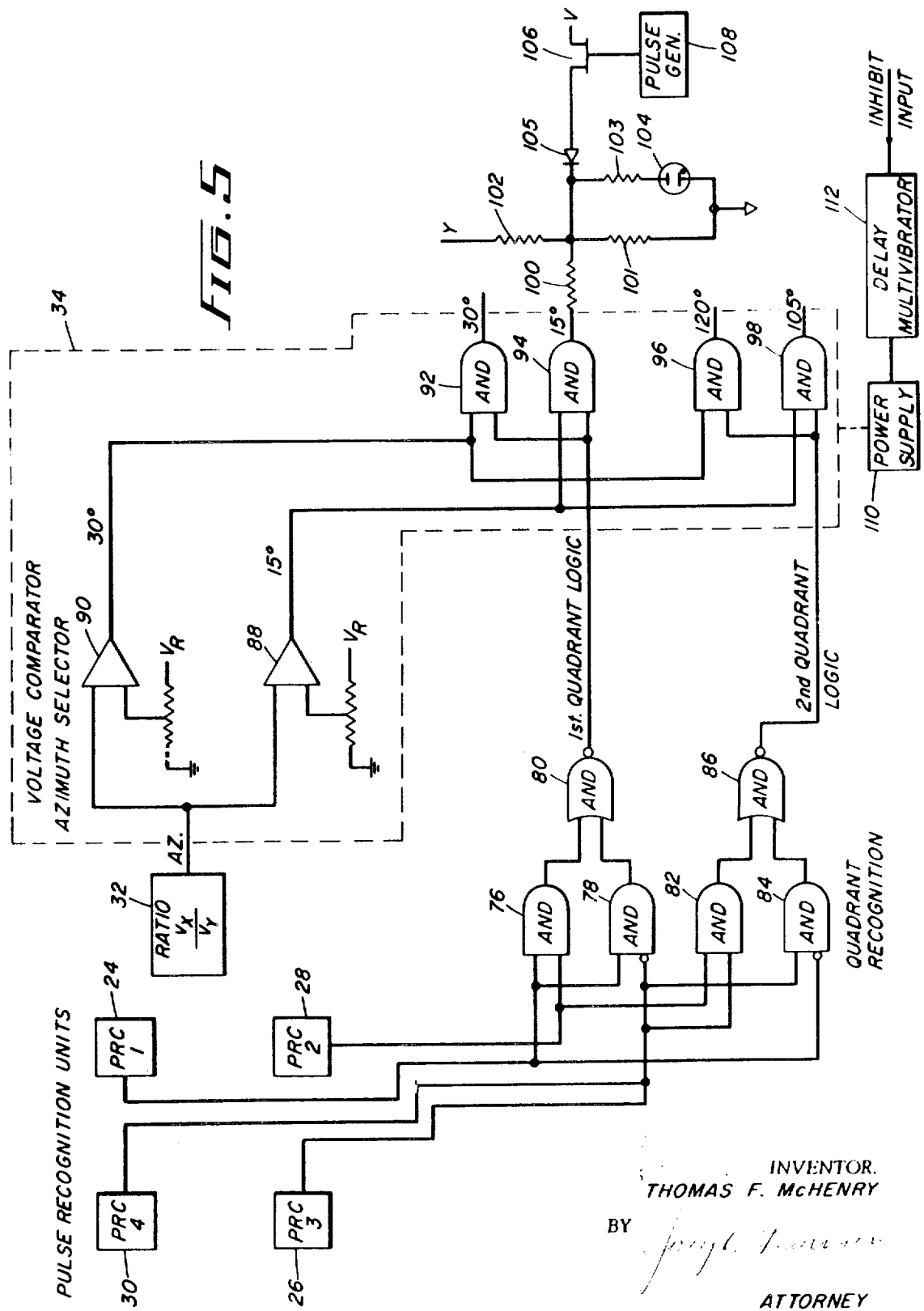
FIG. 5 shows a schematic diagram of the logic circuitry and one form of display which may be used in the circuit of FIG. 3.
Figure 6:
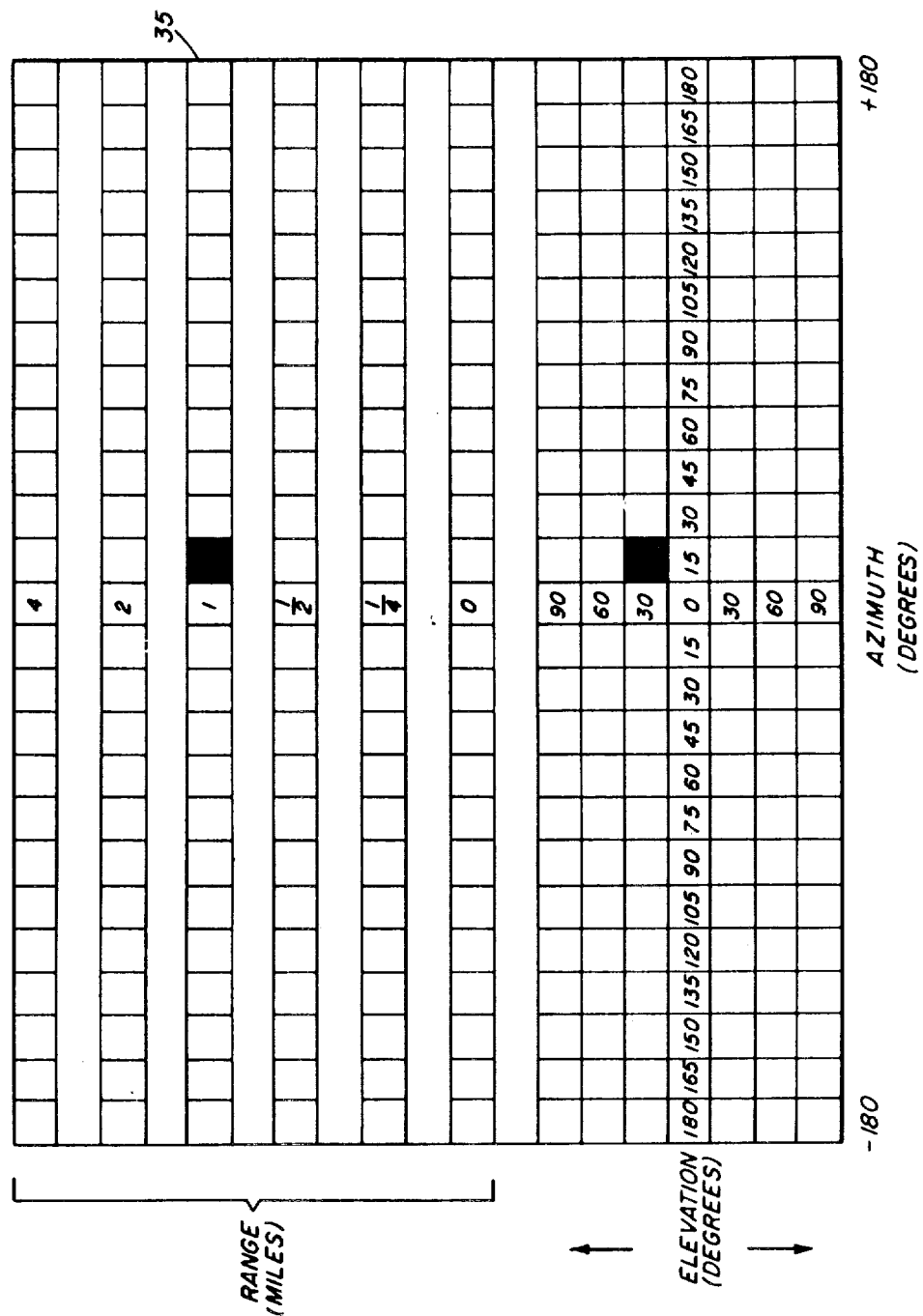
FIG. 6 illustrates a front panel of one type of display which may be utilized in the collision avoidance system embodied in this invention.

The block diagram in FIG. 3 does not show a method and structure for deriving the direction of the signals received from the flashing beacons of approaching aircraft. This processing logic is partially shown and described in connection with FIG. 5. For each of illustration and description, the logic of the azimuth process only is described. If 15° azimuth indications are utilized in the display, as is illustrated in FIG. 6, and treating only the azimuth channel, this reduces the problem to measuring the signals from four detectors and determining which one of 24 azimuth elements is indicated.

First, it should be noted that only two detectors can ever be illuminated by a single flash in the azimuth direction, and these detectors must be adjacent. Therefore, proceeding around the detector cube 15, the sum of the outputs of the pulse recognition circuits 24 and 26 will always equal the output of either the pulse recognition circuit 24 or 26, since they cannot be illuminated simultaneously. Similarly, the sum of pulse recognition circuits 28 and 30 will always be equal to either one or the other.

It has previously been shown that the ratio of outputs of adjacent detectors is equal to the tangent of the angle of the source, and this ratio has been produced by the ratio circuit 32 to produce the azimuth signal. As shown in FIG. 5, the azimuth signal from ratio circuit 32 is applied to a level voltage comparator 34, including two units 88 and 90 which are but two of the six required for six 15° indications. The comparator 34 will then provide an output signal on one, and only one, of its six outputs. This will provide a selection of one of six angles in each quadrant. The output of the comparator 88 is applied to an AND gate 94 and an AND gate 98, as well as two other AND gates which are not shown. The output of the comparator 90 is applied to an AND gate 92 as well as an AND gate 96. The diagram of FIG. 5 merely indicates two angles in two quadrants, it being understood that it is necessary to determine in which of four quadrants the signal appears, which will require 24 AND gates, or 6 for each quadrant. It will appear obvious that the comparator circuits 88 and 90 can determine the angle but not the quadrant in which the signal appears. To determine the quadrant, and here again it will be appreciated that the FIG. 4 shows only two quadrants' logic, four will be necessary. If a signal appears from pulse recognition circuit 24, the source is either in the first or the fourth quadrant. However, if there is also a signal from pulse recognition circuit 28, the signal must be in the first quadrant. But a simple AND gate is not enough, because we must provide for a source causing a signal from the detector feeding pulse recognition circuit 24 alone. Therefore, pulse recognition circuits 24 and 28, or 24 and not 30, will indicate that the source is in the first quadrant. Accordingly, pulse recognition circuit 24 is connected to AND gate 76 and AND gate 78, while pulse recognition circuit 28 is connected to AND gate 76, and pulse recognition circuit 30 is connected to AND gate 78. AND gates 76 and 78 are connected to an AND gate 80, so that a signal from AND gate 80 is applied to AND gates 92 and 94, indicating a first quadrant signal when signals are applied from the pulse recognition circuits 24 and 28 and from pulse recognition circuit 24 and not 30. The second quadrant logic, including AND gates 82, 84 and 86, feeding AND gates 96 and 98, are identical, and the circuitry is symmetrical. AND gate 82 is energized by signals from pulse recognition circuits 28 and 26, and AND gate 84 is energized by pulse recognition circuit 30 and not by pulse recognition circuit 24. The AND gate 86 is triggered indicating a second quadrant signal. The third and fourth quadrant recognition and logic circuitry are not shown, but are identical to that shown with respect to the first and second quadrants. The elevation logic is also derived in a similar fashion.

The display 35 may be in any suitable from of visual or audible indication, or a combination of both, utilizing the signals provided in the present system to indicate range, elevation and azimuth. One visual form of display is shown in FIG. 6, which employs a rectangular neon-bulb panel display whose individual elements are switched on by the logic circuitry of the invention, defining the position and range of the aircraft being detected. The display 35 is divided into a lower portion with rectilinear coordinates defining the position of the detected aircraft in azimuth (abscissa with markings every 15°), and in elevation (ordinate with markings every 30°). A second section, located above the first, provides and indication of the approximate range of the aircraft (ordinate, with markings of one-quarter, one-half, and 1, 2 and 4 miles). The abscissa for the range indications coincide with the position data.

The elements of the display 35 may be illuminated by a neon bulb circuit of the type shown in FIG. 5. Each element on the display is comprised of a neon lamp 104, resistors 100, 101, 102, 103, and a diode 105. The diode 105 is connected through a transistor switch 106 to a source of supply voltage. The resistors 100, 101 and 102 are connected in a simple adding circuit with the resistor 103 connected in series with the neon lamp 104. A supply voltage V is selected which is sufficient to sustain the firing of the neon bulb 104. The resistor 103 is matched with the neon bulb 104 so that the proper current flows through the lamp when the voltage V is applied thereto. In the absence of a signal across resistor 100 from the azimuth axis and a signal across resistor 102 from the elevation axis, the neon bulb will not fire. However, if both resistor 100 and 102 are pulsed from outputs such as the AND gate 94, the junction of resistors 100 and 102 will rise to a point sufficient to fire the neon bulb 104. Once the neon bulb 104 ignites, the lamp will obtain its sustaining current from the voltage supply through the diode 105 and through resistor 103. The voltage across resistors 100 and 102 are not continuous voltages, but are only pulsed for a short time, on the order of a millisecond, and after the pulse the junction of these resistors is returned to zero volts. Thus, when the resistors 100 and 102 are connected to the appropriate azimuth and elevation outputs and are pulsed together, the neon bulb 104 will fire and will stay lit, being sustained by the power supply flowing through the resistor 103.

For the display shown in FIG. 6, 288 individual neon bulbs with their associated circuitry are required. Each neon bulb will light up and indicate a position on the display panel 35, referring either to an azimuth and elevation location or an azimuth and range position. These neon lamps may be covered by a colored filter in order to provide a good contrast ratio at high ambient light levels. With the large number of elements, it came desirable that the panel use a method of X-Y coordinates rather than individual circuitry for each position on the panel. Accordingly, a crossbar switching-type system may be utilized with common X- and Y-coordinate leads interconnecting the individual neon bulb circuits with their cooperating elevation and azimuth gates. This arrangement would require only 36 different connections to the X- and Y-axes instead of each individual circuit requiring separate connections from each AND gate indicating the elevation, range, and azimuth.

In order to handle the problem of multiple targets, a pulse generator 108 is provided in the circuit shown in FIG. 5 to interrupt the power supply via transistor switch 106 to the neon bulb 104. This will effectively disconnect the power supply from the entire panel 35, which will go black and be ready to be recycled from the next pulse coming from an aircraft. If this were not done, every time a recurring pulse came in from an aircraft, one of the neon lamps on the panel would light up and stay lit. By disconnecting the power supply periodically, for example once every 1½ seconds, assuming the aircraft source sends out pulses at the rate of 1 per second, the panel can be recycled to receive the next pulse. Therefore, if two aircraft are present, the appropriate neon lamps can light up, indicating each aircraft's individual elevation and azimuth position. Then the panel is darkened and the entire panel reset and ready to receive new elevation and azimuth position information. The cycle is continuously repeated.

Another problem which may occur is the possibility of the sensor receiving signals from its own source or beacon. To this end power supply 110 for the voltage comparator selector gates is triggered by a delay multivibrator 112 which is driven by the beacon source located on the same aircraft as the panel. Accordingly, the AND gates are inhibited during the interval of the source flash on the same aircraft. In other words, only signals from other aircraft are displayed on the panel.

The aircraft collision avoidance system embodied in this invention provides a no-moving-parts sensor which is rugged and capable of informing the pilot of the presence, direction, and range of another beacon-carrying aircraft or a multiplicity of such aircraft. The pilot will have little difficulty in identifying the position and range, and will be able to determine the direction of motion of such aircraft. If the approaching airplane is seen at constant azimuth from the monitoring aircraft and at a low elevation angle and only indicating lamps for range are seen to decrease, there would be an obvious danger of collision requiring some action on the part of the pilot.

I claim:

1. An airplane collision avoidance system for detecting and displaying predetermined repetitive signals from approaching aircraft for indicating the location of such aircraft, comprising
   a. At least three detector pairs positioned in a cube configuration, looking in opposite directions along X-, Y- and Z- orthogonal axes which are responsive to and generate signals in accordance with the radiation from said predetermined repetitive signals,
   b. signal recognition circuit means coupled to each of said detectors for passing the predetermined repetitive signals while discriminating against all other signals,
   c. means coupled to said signal recognition circuit means for deriving signals indicative of azimuth, elevation and range of said predetermined repetitive signals from an approaching aircraft, and
   d. display means coupled to said last-named means for providing a visual indication of the position of the approaching aircraft.

2. An airplane collision avoidance system for detecting and displaying predetermined repetitive signals from approaching aircraft for indicating the location of such aircraft, comprising
   a. at least three detector pairs positioned looking in opposite directions along X-, Y- and Z-orthogonal axes which are responsive to and generate signals in accordance with the radiation from said predetermined repetitive signals,
   b. signal recognition circuit means coupled to each of said detectors for passing the predetermined repetitive signals while discriminating against all other signals,
   c. ratio means coupled to said signal recognition means providing a ratio signal between the detectors on said X and Y axis for producing a signal indicating azimuth position,
   d. adder means coupled to said signal recognition means for adding signals of the detectors on said X and Y axes.
   e. means coupled to said signal recognition circuit means for deriving signals indicative of azimuth, elevation and range of said predetermined repetitive signals from an approaching aircraft, and f. display means coupled to said last named means for providing a visual indication of the position of the approaching aircraft.

3. The airplane collision avoidance system set forth in claim 1 wherein each of said detectors is provided with a reflective collar.

4. The airplane collision avoidance system set forth in claim 2 wherein said detector pairs are positioned in a cube configuration.

5. The airplane collision avoidance system set forth in claim 2 wherein each of said detectors is provided with a reflective collar.

6. The airplane collision avoidance system set forth in claim 2 including means for periodically inhibiting and resetting said display means.